(12) United States Patent
Sun

(10) Patent No.: US 11,575,324 B2
(45) Date of Patent: Feb. 7, 2023

(54) CONTROL METHOD AND CONTROL CIRCUIT FOR A BOOST CONVERTER

(71) Applicant: Silergy Semiconductor Technology (Hangzhou) LTD, Hangzhou (CN)

(72) Inventor: Liangwei Sun, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/361,688

(22) Filed: Jun. 29, 2021

(65) Prior Publication Data

US 2021/0328497 A1 Oct. 21, 2021

Related U.S. Application Data

(63) Continuation of application No. 16/268,646, filed on Feb. 6, 2019, now Pat. No. 11,081,953.

(30) Foreign Application Priority Data

Mar. 15, 2018 (CN) .......................... 201810215092.3

(51) Int. Cl.
| | | |
|---|---|---|
| *H02M 3/158* | (2006.01) | |
| *H02M 1/08* | (2006.01) | |
| *H02M 3/156* | (2006.01) | |

(52) U.S. Cl.
CPC ........... *H02M 3/1588* (2013.01); *H02M 1/08* (2013.01); *H02M 3/156* (2013.01); *H02M 3/158* (2013.01)

(58) Field of Classification Search
CPC ....... H02M 3/158; H02M 3/1588; H02M 1/08
See application file for complete search history.

(56) References Cited

U.S. PATENT DOCUMENTS

| | | | |
|---|---|---|---|
| 9,130,460 B2 | 9/2015 | Sun et al. | |
| 9,543,822 B2 | 1/2017 | Hang et al. | |
| 9,559,591 B2 | 1/2017 | Hang et al. | |
| 2007/0057655 A1 | 3/2007 | Nishida | |
| 2008/0018366 A1* | 1/2008 | Hanna | H02M 1/08 327/112 |
| 2008/0203986 A1 | 8/2008 | Nakatani | |
| 2013/0063180 A1 | 3/2013 | Sun et al. | |
| 2014/0070779 A1 | 3/2014 | Takagi et al. | |
| 2016/0211745 A1 | 7/2016 | Hang et al. | |
| 2017/0063238 A1 | 3/2017 | Hang et al. | |

FOREIGN PATENT DOCUMENTS

CN 106685201 A 5/2017

* cited by examiner

*Primary Examiner* — Alex Torres-Rivera

(57) ABSTRACT

A control circuit for a boost converter can include: a comparison circuit configured to compare an input voltage of the boost converter against an output voltage of the boost converter, and to generate first and second control signals; an option circuit configured to provide a third control signal generated by a drive circuit of the boost converter to a control terminal of a synchronous power transistor of the boost converter, in accordance with the first and second control signals, when the output voltage is greater than the input voltage; and the option circuit being configured to provide a DC voltage to the control terminal of the synchronous power transistor, in accordance with the first and second control signals, in order to provide a current path for an inductor current of the boost converter through the synchronous power transistor, when the output voltage is not greater than the input voltage.

16 Claims, 8 Drawing Sheets

CONTROL METHOD AND CONTROL
CIRCUIT FOR A BOOST CONVERTER

RELATED APPLICATIONS

This application is a continuation of the following application, U.S. patent application Ser. No. 16/268,646, filed on Feb. 6, 2019, and which is hereby incorporated by reference as if it is set forth in full in this specification, and which also claims the benefit of Chinese Patent Application No. 201810215092.3, filed on Mar. 15, 2018, which is incorporated herein by reference in its entirety.

FIELD OF THE INVENTION

The present invention generally relates to the field of power electronics, and more particularly to control circuits and methods for boost converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
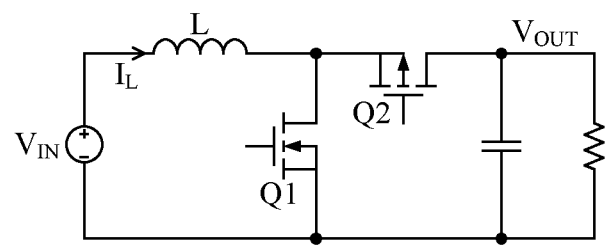
FIG. 1 is a schematic block diagram of an example boost converter.

Referring now to FIG. 1, shown is a schematic block diagram of an example boost converter. A boost circuit is a widely used topology in boost conversion applications (e.g., boosting a lithium battery voltage at 4.2V to a USB charging port voltage at 5V, etc.). However, the boost circuit may be disabled when an output voltage is not greater than an input voltage since the inductor current may not be normally reset. In FIG. 1, during the startup stage, main power transistor Q1 may not be turned on, and inductor current $I_L$ of the circuit can increase after synchronous power transistor Q2 is turned on. In order for inductor current $I_L$ to be reset normally, output voltage $V_{OUT}$ may need to be greater than input voltage $V_{IN}$, such that the circuit can operate properly. Therefore, for a synchronous boost converter, when the boost converter starts, the output voltage may not be greater than the input voltage, which can increase design complexity of a startup circuit.

Figure 2A:
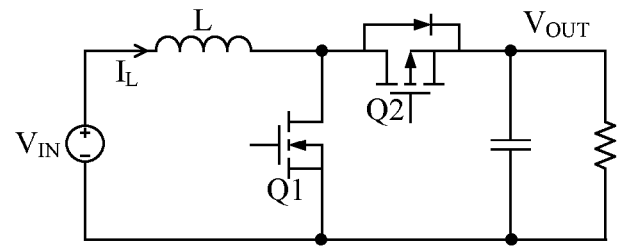
FIG. 2A is a schematic block diagram of a first example improved boost converter.

Referring now to FIG. 2A, shown is a schematic block diagram of a first example improved boost converter. Before the synchronous boost converter operates, a path from input voltage $V_{IN}$ to output voltage $V_{OUT}$ may be formed through a parasitic body diode of synchronous power transistor Q2. Thus, output voltage $V_{OUT}$ can rise to the vicinity of input voltage $V_{IN}$, and then the boost converter may begin to operate, in order to ensure that the inductor current is reset normally. However, the input and output terminals may not be separated, such that if input voltage $V_{IN}$ has an applied voltage, output voltage $V_{OUT}$ may also have a voltage. In addition, when input voltage $V_{IN}$ is powered up, a relatively large inrush current may flow through inductor L and the parasitic body diode of synchronous power transistor Q2, thereby reducing the reliability of inductor L and synchronous power transistor Q2. Further, the soft start time for establishing output voltage $V_{OUT}$ may not be effectively controlled.

Figure 2B:
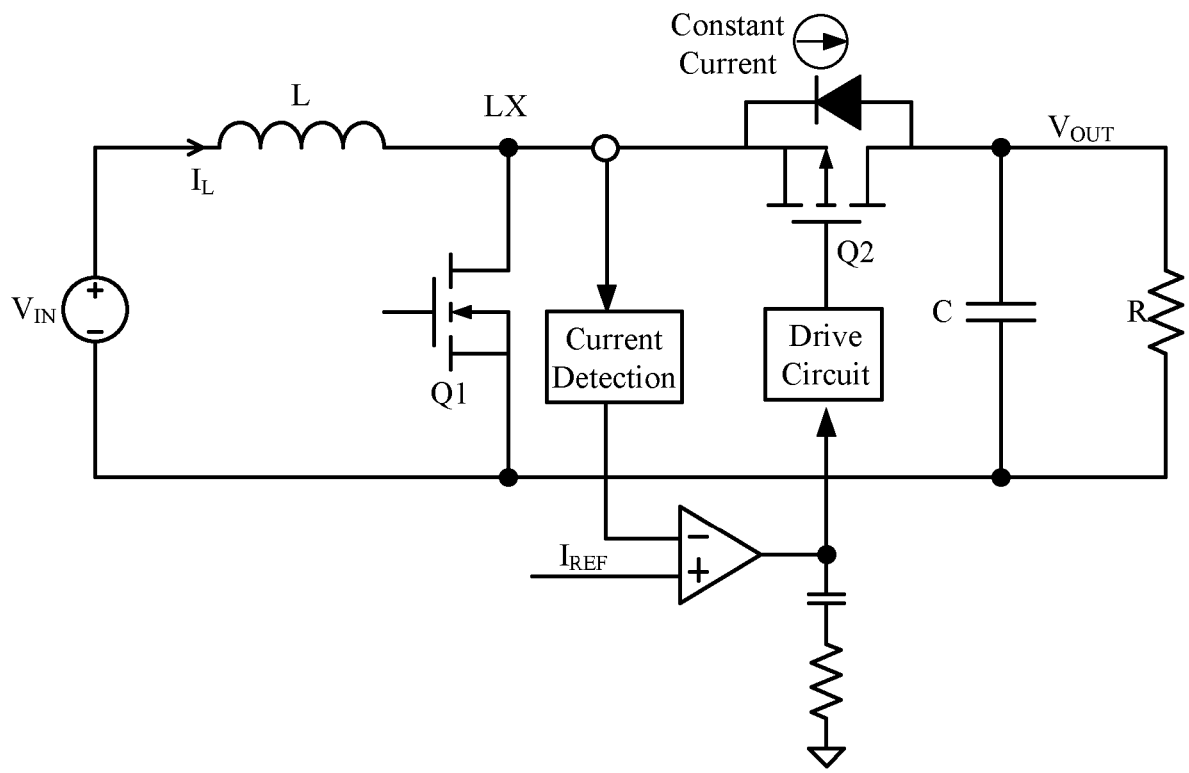
FIG. 2B is a schematic block diagram of a second example improved boost converter.

Referring now to FIG. 2B, shown is a schematic block diagram of a second example improved boost converter. When output voltage $V_{OUT}$ is not greater than input voltage $V_{IN}$, main power transistor Q1 may not be turned on. The control terminal of synchronous power transistor Q2 can be controlled by sampling the current flowing through synchronous power transistor Q2, such that synchronous power transistor Q2 is equivalent to a current source to charge the output terminal. When output voltage $V_{OUT}$ approaches input voltage $V_{IN}$, the boost converter may transition from the startup mode to the operation mode, thereby ensuring that the inductor current can be reset normally. However, this approach introduces additional components, which increases circuit complexity.

In one embodiment, a control circuit for a boost converter can include: (i) a comparison circuit configured to compare an input voltage of the boost converter against an output voltage of the boost converter, and to generate first and second control signals; (ii) an option circuit configured to provide a third control signal generated by a drive circuit of the boost converter to a control terminal of a synchronous power transistor of the boost converter, in accordance with the first and second control signals, when the output voltage is greater than the input voltage; and (iii) the option circuit being configured to provide a DC voltage to the control terminal of the synchronous power transistor, in accordance with the first and second control signals, in order to provide a current path for an inductor current of the boost converter through the synchronous power transistor, when the output voltage is not greater than the input voltage.

Figure 3:
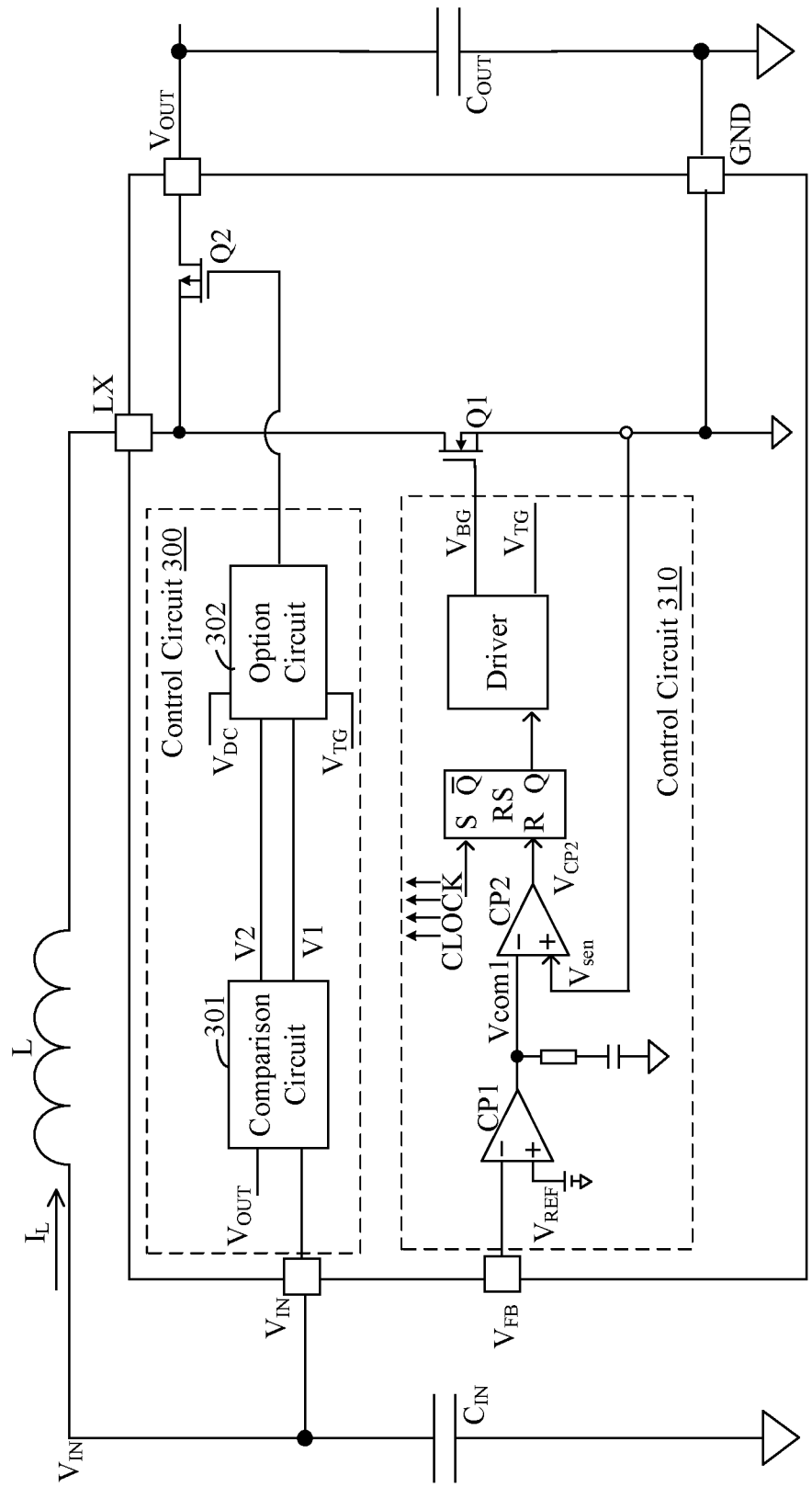
FIG. 3 is a schematic block diagram of an example control circuit for a boost converter, in accordance with embodiments of the present invention.

Referring now to FIG. 3, shown is a schematic block diagram of an example control circuit for a boost converter, in accordance with embodiments of the present invention. In this particular example, the boost converter can include input capacitor $C_{IN}$, inductor L, output capacitor $C_{OUT}$, main power transistor Q1, synchronous power transistor Q2, control circuit 310, and control circuit 300. Input capacitor $C_{IN}$ can connect to an input terminal of the boost converter, and may provide input voltage $V_{IN}$ to first power terminals of main power transistor Q1 and synchronous power transistor Q2 respectively through inductor L. A second power terminal of main power transistor Q1 can connect to ground, and a second power terminal of synchronous power transistor Q2 can connect to an output terminal of the boost converter. A first terminal of output capacitor $C_{OUT}$ can connect to the second power terminal of synchronous power transistor Q2, and a second terminal of output capacitor $C_{OUT}$ can connect to ground. For example, main power transistor Q1, synchronous power transistor Q2, control circuit 310, and control circuit 300 may be integrated inside an integrated circuit (IC) or chip, and other circuit components can be arranged outside (e.g., on a printed-circuit board [PCB]) the chip. The voltage at a terminal of inductor L that can connect to a common terminal of the first power terminals of main power transistor Q1 and synchronous power transistor Q2 may be indicated as port voltage $V_{LX}$.

Control circuit 310 can include comparator CP1, comparator CP2, flip-flop RS, and drive circuit Driver. A non-inverting input terminal of comparator CP1 can receive reference voltage $V_{REF}$, an inverting input terminal can receive feedback signal $V_{FB}$ characterizing the output voltage, and an output terminal can generate comparison signal Vcom1. A non-inverting input terminal of comparator CP2 can receive inductor current sampling signal $V_{sen}$, an inverting input terminal can receive comparison signal Vcom1, and an output terminal can generate comparison signal $V_{CP2}$. Also, reset terminal R of flip-flop RS can receive comparison signal $V_{CP2}$, set terminal S of flip-flop RS can receive clock signal CLOCK, and an output terminal of flip-flop RS can generate a logic signal to be provided to drive circuit Driver. Control signal $V_{BG}$ for controlling main power transistor Q1, and control signal $V_{TG}$ for controlling synchronous power transistor Q2, can be generated by driver circuit Driver according to the logic signal.

In this particular example, control circuit 300 can include comparison circuit 301 and option circuit 302. Comparison circuit 301 can compare input voltage $V_{IN}$ against output voltage $V_{OUT}$ of the boost converter, and may generate signals V1 and V2. When output voltage $V_{OUT}$ is greater than input voltage $V_{IN}$, control signal $V_{TG}$ generated by drive circuit Driver can be provided to the control terminal of synchronous power transistor Q2 by option circuit 302, according to signals V1 and V2. When output voltage $V_{OUT}$ is not greater than input voltage $V_{IN}$, DC voltage VDC can be provided to the control terminal of synchronous power transistor Q2 by option circuit 302 according to signals V1 and V2. For example, DC voltage Vic is less than or equal to input voltage $V_{IN}$. Before output voltage $V_{OUT}$ becomes greater than input voltage $V_{IN}$, an inductor current can charge a junction capacitor of main power transistor, such that synchronous power transistor Q2 begins to enter a saturation region until fully being turned on in order to provide a current path for the inductor current.

Figure 4:
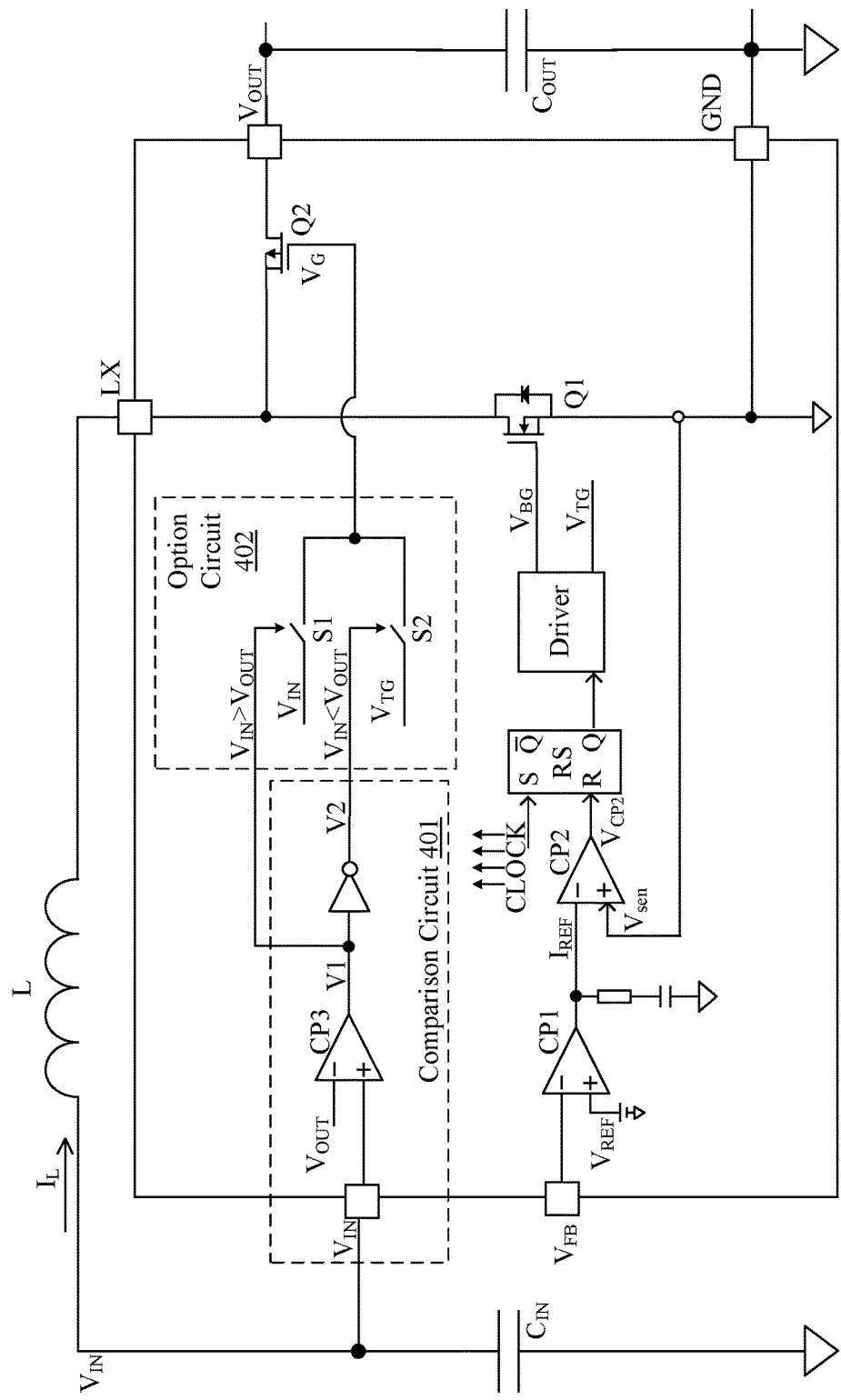
FIG. 4 is a schematic block diagram of an example control circuit for a boost converter, in accordance with embodiments of the present invention.

Referring now to FIG. 4, shown is a schematic block diagram of an example control circuit for a boost converter, in accordance with embodiments of the present invention. In this particular example, comparison circuit 401 can include comparator CP3 and an inverter. A non-inverting input terminal of comparator CP3 can receive input voltage $V_{IN}$, an inverting input terminal can receive output voltage $V_{OUT}$, and an output terminal can generate signal V1. The inverter can receive signal V1 at an input terminal, and may generate signal V2 at an output terminal. For example, option circuit 402 can include switches S1 and S2. Switch S1 can be controlled by signal V1, a first terminal of switch S1 can receive the DC voltage (e.g., input voltage $V_{IN}$), and a second terminal of switch S1 can control terminal $V_G$ of synchronous power transistor Q2. Switch S2 can be controlled by signal V2, a first terminal of switch S2 can receive control signal $V_{TG}$, and a second terminal of switch S2 can control terminal $V_G$ of synchronous power transistor Q2.

For example, when input voltage $V_{IN}$ is greater than output voltage $V_{OUT}$, signal V1 generated by comparator CP3 may be high, and correspondingly signal V2 can be low. Thus, switch S1 may be turned on and switch S2 turned off, such that input voltage $V_{IN}$ is provided to control terminal $V_G$ of synchronous power transistor Q2. When input voltage $V_{IN}$ is not greater than output voltage $V_{OUT}$, signal V1 generated by comparator CP3 can be low, and correspondingly signal V2 may be high. Thus, switch S1 can be turned off and switch S2 turned on, such that control signal $V_{TG}$ is provided to control terminal $V_G$ of synchronous power transistor Q2. For example, the synchronous power transistor can be a P-type power transistor.

Figure 5:
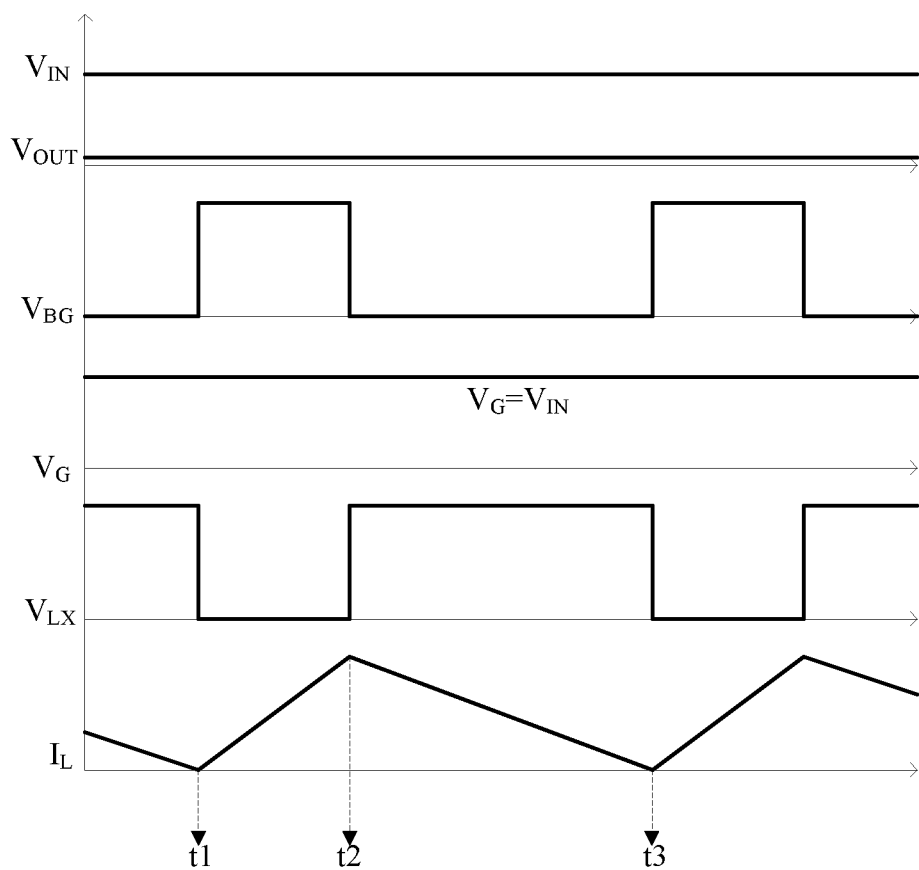
FIG. 5 is a waveform diagram of example operation of the boost converter of FIG. 4 when an output voltage is not greater than an input voltage, in accordance with embodiments of the present invention.

Referring now to FIG. 5, shown is a waveform diagram of example operation of the boost converter of FIG. 4 when an output voltage is not greater than an input voltage, in accordance with embodiments of the present invention. In this particular example, when the circuit starts to operate, output voltage $V_{OUT}$ may be near zero, and input voltage $V_{IN}$ is greater than output voltage $V_{OUT}$, such that switch S1 is turned on and switch S2 is turned off. During this time period, input voltage $V_{IN}$ may be provided to the control terminal of synchronous power transistor Q2.

During time period t1-t2, when control signal $V_{BG}$ is high, main power transistor Q1 can be turned on, such that port voltage $V_{LX}$ is equal to zero. Also, input voltage $V_{IN}$ may be provided to the control terminal of synchronous power transistor Q2, such that synchronous power transistor Q2 is in a turn-off state, and inductor current $I_L$ can increase. During time period t2-t3, when control signal $V_{BG}$ is low, main power transistor Q1 can be turned off. At time t2, main power transistor Q1 and synchronous power transistor Q2 may both be in a turn-off state. Since inductor current $I_L$ may not change suddenly, inductor current $I_L$ can charge the junction capacitor of main power transistor Q1, such that port voltage $V_{LX}$ rises from zero.

When port voltage $V_{LX}$ rises to a value that is above input voltage $V_{IN}$ by threshold voltage $V_{TH}$ of synchronous power transistor Q2, synchronous power transistor Q2 can begin to be turned on, and then to enter the saturation region until turned on. After that, inductor current $I_L$ can flow through synchronous power transistor Q2 in order to provide energy to the output terminal. Since port voltage $V_{LX}$ is above input voltage $V_{IN}$ by threshold voltage $V_{TH}$, inductor current $I_L$ can be reset normally. At time t3, control signal $V_{BG}$ may transition from low to high, such that main power transistor Q1 is turned on again. Also, port voltage $V_{LX}$ can be equal to zero, and synchronous power transistor Q2 may be turned off. Then, the next cycle can begin.

Figure 6:
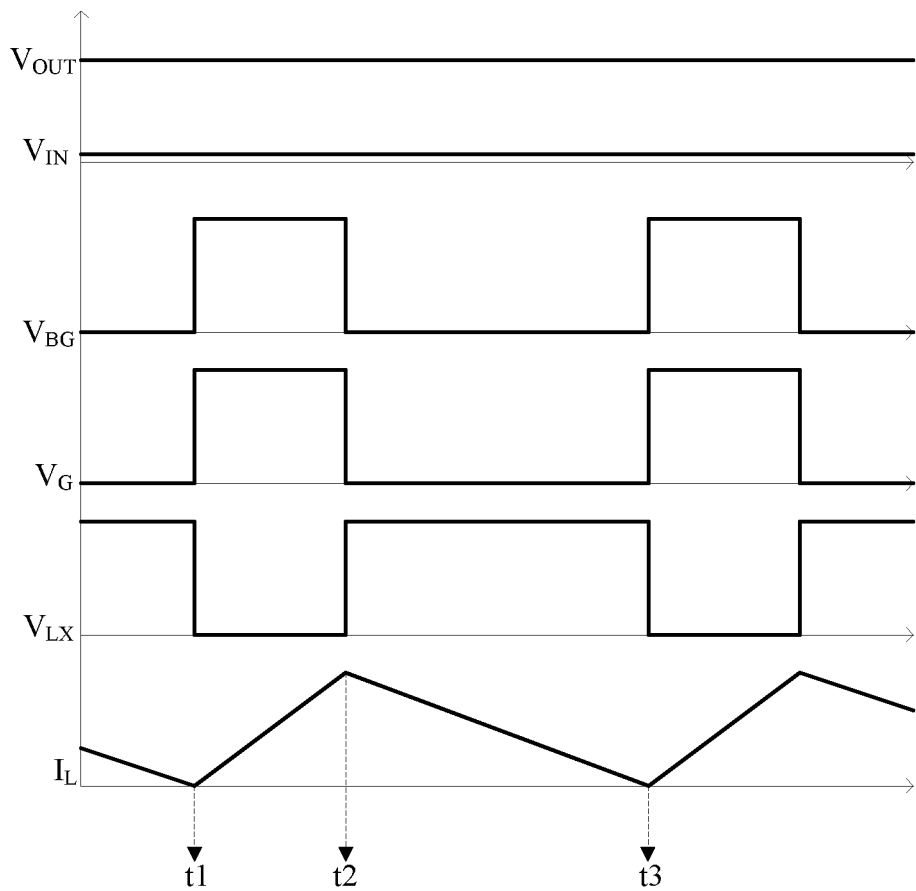
FIG. 6 is a waveform diagram of example operation of the boost converter of FIG. 4 when an output voltage is greater than an input voltage, in accordance with embodiments of the present invention.

Referring now to FIG. 6, shown is a waveform diagram of example operation of the boost converter of FIG. 4 when an output voltage is greater than an input voltage, in accordance with embodiments of the present invention. In this particular example, when output voltage $V_{OUT}$ rises to be greater than input voltage $V_{IN}$, switch S1 can be turned off, and switch S2 turned on. During this time period, control signal $V_{TG}$ may be provided to the control terminal of synchronous power transistor Q2, and control of the circuit can transition to a standard boost control mode. During time period t1-t2, when control signal $V_{BG}$ is high, main power transistor Q1 can be turned on, such that port voltage $V_{LX}$ is equal to zero. Also, input voltage $V_{IN}$ may be provided to the control terminal of synchronous power transistor Q2, such that synchronous power transistor Q2 is in a turn-off state, and inductor current $I_L$ increases. During time period t2-t3, when control signal $V_{BG}$ is low, main power transistor Q1 may be turned off. During this time period, control signal $V_{TG}$ can also be low, such that synchronous power transistor Q2 is turned on. Then, port voltage $V_{LX}$ may be equal to output voltage $V_{OUT}$, which is greater than input voltage $V_{IN}$, and inductor current $I_L$ can be reset normally as a result.

Figure 7:
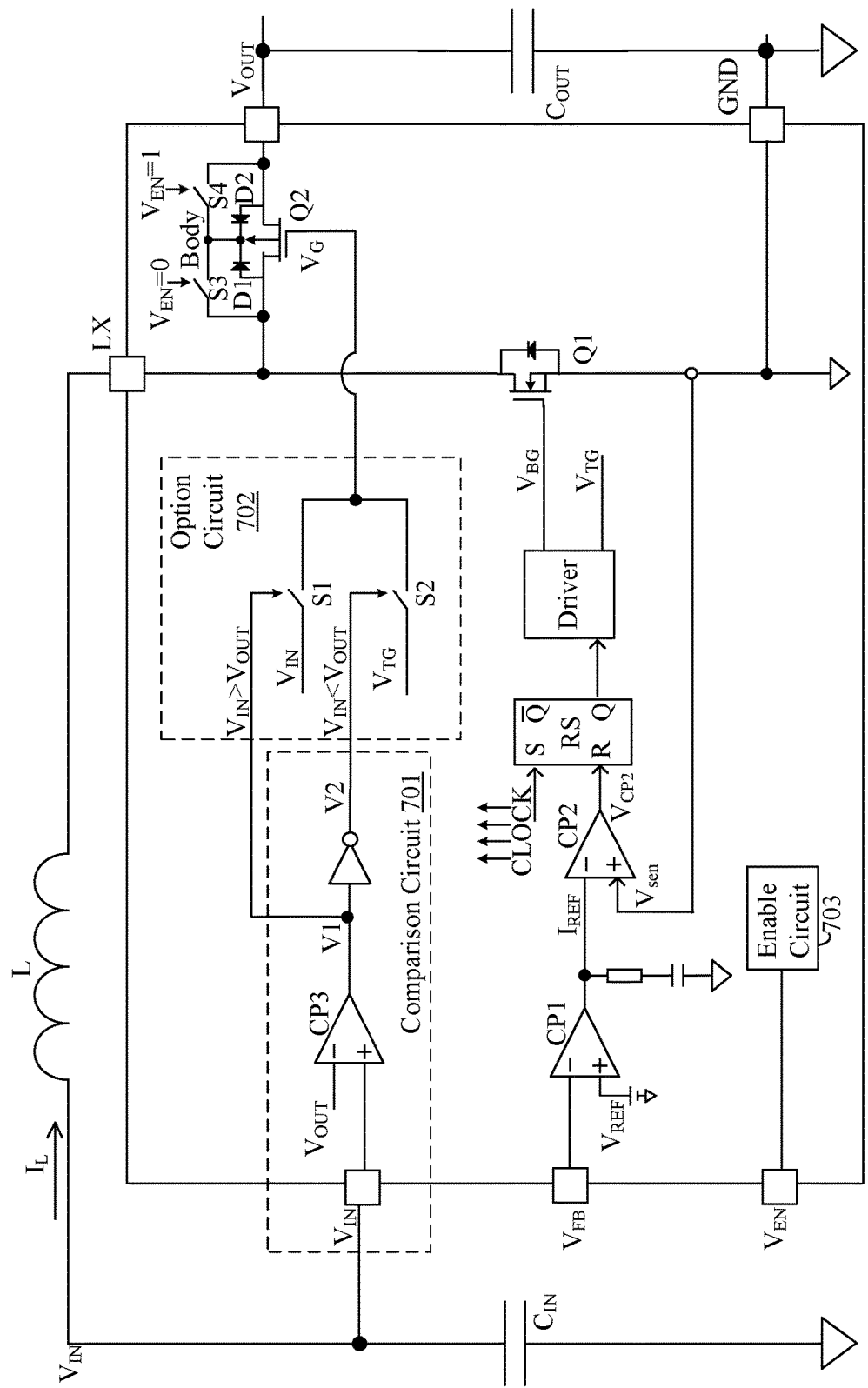
FIG. 7 is a schematic block diagram of another example control circuit for a boost converter, in accordance with embodiments of the present invention.

Referring now to FIG. 7, shown is a schematic block diagram of another example control circuit for a boost converter, in accordance with embodiments of the present invention. In this particular example, the control circuit can also include enable circuit 703 that generates enable signal $V_{EN}$. When enable signal $V_{EN}$ is low, synchronous power transistor Q2 can be controlled by enable signal $V_{EN}$ to cut off the current path for inductor current $I_L$ flowing to the output terminal of the boost converter. When enable signal $V_{EN}$ is active, synchronous power transistor Q2 can be controlled by enable signal $V_{EN}$ to provide the current path for inductor current $I_L$ flowing to the output terminal of the boost converter. For example, parasitic diodes D1 and D2 can be coupled in series between the first and second power terminals of synchronous power transistor Q2.

An anode of parasitic diode D1 can connect to the first power terminal of synchronous power transistor Q2, and a cathode can connect to the body region of synchronous power transistor Q2. An anode of parasitic diode D2 can connect to the second power terminal of synchronous power transistor Q2, and a cathode can connect to the body region of synchronous power transistor Q2. Also, switch S3 can connect between the first power terminal and the body region of synchronous power transistor Q2, and switch S4 can connect between the second power terminal and the body region of synchronous power transistor Q2. Switches S3 and S4 may be controlled by enable signal $V_{EN}$ that is generated by the enable circuit. For example, when enable signal $V_{EN}$ is low, switch S3 may be turned on and switch S4 turned off. Thus, input voltage $V_{IN}$ may not be transferred to the output terminal, which can indicate that the boost converter is not operating. When enable signal is high, switch S3 may be turned off and switch S4 can be turned on. Thus, input voltage $V_{IN}$ can be transferred to the output terminal through parasitic diode D1 and switch S4, which may indicate that the boost converter is operating.

In one embodiment, a method of controlling a boost converter, can include: (i) generating, by a comparison circuit, first and second control signals by comparing an input voltage of the boost converter against an output voltage of the boost converter; (ii) providing, by an option circuit, a third control signal generated by a drive circuit of the boost converter to a control terminal of a synchronous power transistor of the boost converter, in accordance with the first and second control signals, when the output voltage is greater than the input voltage; and (iii) providing, by the option circuit, a DC voltage to the control terminal of the synchronous power transistor when the output voltage is not greater than the input voltage, in order to provide a current path for an inductor current of the boost converter through the synchronous power transistor.

Figure 8:
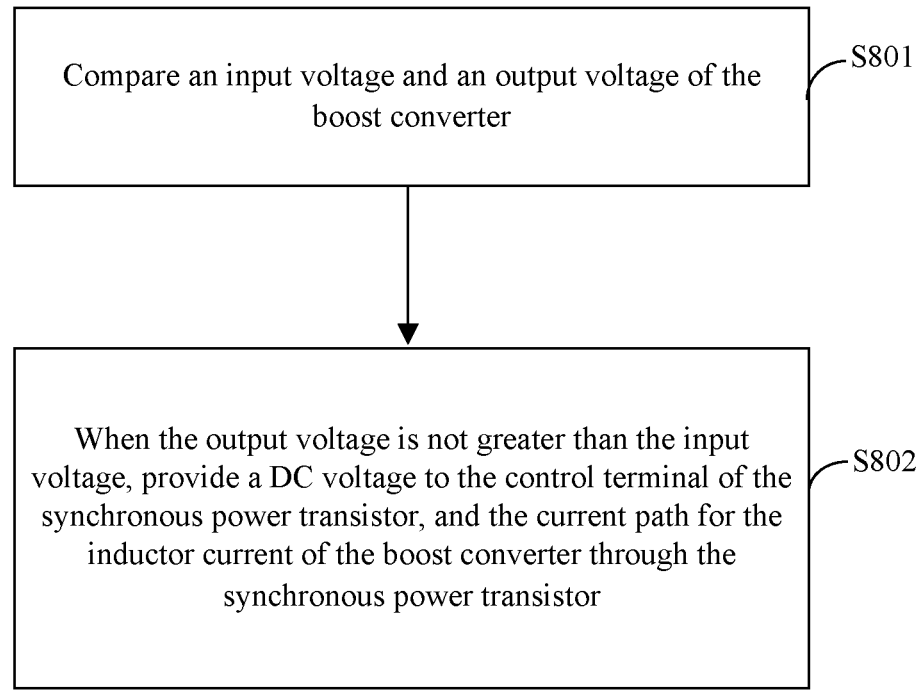
FIG. 8 is a flow diagram of an example control method for a boost converter, in accordance with embodiments of the present invention.

Referring now to FIG. 8, shown is a flow diagram of an example control method for a boost converter, in accordance with embodiments of the present invention. In this particular example, at S801, the input voltage can be compared against the output voltage of the boost converter. At S802, if the output voltage is not greater than the input voltage, a DC voltage (e.g., the DC voltage is not greater than the input voltage) may be provided to the control terminal of the synchronous power transistor, and a current path can be provided for the inductor current of the boost converter through the synchronous power transistor.

When the output voltage is not greater than the input voltage, the inductor current can charge a junction capacitor of the main power transistor, and the synchronous power transistor may begin to enter the saturation region until fully turned on to provide the current path for the inductor current. This example control method can also include controlling the control terminal of synchronous power transistor according to a control signal generated by the drive circuit of the boost converter, when the output voltage is greater than the input voltage. The drive circuit can generate control signals to control the main power transistor and the synchronous power transistor, according to a feedback signal characterizing the output voltage of the boost converter and an inductor current sampling signal.

The synchronous power transistor can also receive an enable signal. When the enable signal is inactive, the synchronous power transistor may be controlled to cut off the current path for the inductor current flowing to the output terminal of the boost converter. When the enable signal is active, the synchronous power transistor (e.g., a P-type power transistor) can be controlled to provide the current path for the inductor current flowing to the output terminal of the boost converter. When the output voltage is not greater than the input voltage, the input voltage may be provided (e.g., via option circuit 702) to the control terminal of the synchronous power transistor.

In particular embodiments, the control circuit for the boost converter can control the voltage at the control terminal of the synchronous power transistor by comparing input voltage $V_{IN}$ against output voltage $V_{OUT}$, such that the boost converter can operate when output voltage $V_{OUT}$ is not greater than input voltage $V_{IN}$ and the inductor current can be reset normally. In this way, the design of the startup circuit of the synchronous boost converter can be greatly simplified, as compared to other approaches. In addition, the boost converter can realize seamless switching between the condition that the input voltage is greater than the output voltage, and the condition that the input voltage is not greater than the output voltage, thereby reducing the ripple of the output voltage. Furthermore, the input terminal and the output terminal of the circuit can be separated due to the presence of the enable circuit. When the enable signal is inactive, the boost converter does not operate, and when the enable signal is activated, the boost converter starts to operate, which can improve system reliability.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a boost converter, the method comprising:
   a) comparing, by a comparison circuit, an input voltage of said boost converter against an output voltage of said boost converter;
   b) providing, by an option circuit, a first control signal generated by a drive circuit of said boost converter to control a synchronous power transistor of said boost converter to be turned on and turned off periodically when said output voltage is greater than said input voltage; and
   c) providing, by said option circuit, said input voltage to control said synchronous power transistor to be turned on continuously when said output voltage is not greater than said input voltage.

2. The method of claim 1, further comprising charging a junction capacitor of a main power transistor of said boost converter when said output voltage is not greater than said input voltage, such that said synchronous power transistor begins to enter a saturation region until fully turned on to provide a current path for an inductor current of said boost converter.

3. The method of claim 1, wherein when said output voltage is greater than said input voltage, a second switch in said option circuit is controlled to be turned on, such that said first control signal is provided to a control terminal of said synchronous power transistor to control a switching state of said synchronous power transistor.

4. The method of claim 1, wherein when said output voltage is not greater than said input voltage, a first switch in said option circuit is controlled to be turned on, such that said input voltage is provided to a control terminal of said synchronous power transistor to control a switching state of said synchronous power transistor.

5. The method of claim 1, wherein said synchronous power transistor comprises a P-type power transistor.

6. The method of claim 1, further comprising:
   a) generating an enable signal;
   b) controlling said synchronous power transistor to cut off said current path for said inductor current flowing to an output terminal of said boost converter when said enable signal is inactive; and
   c) controlling said synchronous power transistor to provide said current path for said inductor current flowing to said output terminal of said boost converter when said enable signal is active.

7. A control circuit for a boost converter, the control circuit comprising:
   a) a comparison circuit configured to obtain a comparison result signal between an input voltage of said boost converter and an output voltage of said boost converter;
   b) an option circuit configured to provide a first control signal generated by a drive circuit of said boost converter to a control terminal of a synchronous power transistor of said boost converter to control said synchronous power transistor to be turned on and turned off periodically when said output voltage is greater than said input voltage; and
   c) said option circuit being configured to provide said input voltage to said control terminal of said synchronous power transistor to control said synchronous power transistor to be turned on continuously when said output voltage is not greater than said input voltage.

8. The control circuit of claim 7, wherein when said output voltage is not greater than said input voltage, said inductor current is configured to charge a junction capacitor of a main power transistor of said boost converter, such that said synchronous power transistor begins to enter a saturation region until fully turned on to provide said current path for said inductor current.

9. The control circuit of claim 7, wherein said drive circuit is configured to generate said first control signal, and a second control signal for controlling a main power transistor of said boost converter, wherein said first and second control signals are complementary.

10. The control circuit of claim 9, wherein said first and second control signal are generated by said drive circuit according to an inductor current sampling signal and a feedback signal that characterizes said output voltage of said boost converter.

11. The control circuit of claim 7, wherein when said output voltage is not greater than said input voltage, a first switch in said option circuit is controlled to be turned on, such that said input voltage is provided to said control terminal of said synchronous power transistor to control a switching state of said synchronous power transistor.

12. The control circuit of claim 7, wherein when said output voltage is greater than said input voltage, a second switch in said option circuit is controlled to be turned on, such that said first control signal is provided to said control terminal of said synchronous power transistor to control a switching state of said synchronous power transistor.

13. The control circuit of claim 7, wherein said comparison circuit comprises:
   a) a comparator having a non-inverting input terminal configured to receive said input voltage, an inverting input terminal configured to receive said output voltage, and an output terminal configured to generate a third control signal; and
   b) an inverter having an input terminal configured to receive said third control signal, and an output terminal configured to generate a fourth control signal.

14. The control circuit of claim 13, wherein said option circuit comprises:
   a) a first switch having a control terminal configured to receive said third control signal, a first terminal coupled to said input voltage, and a second terminal coupled to said control terminal of said synchronous power transistor; and
   b) a second switch having a control terminal configured to receive said fourth control signal, a first terminal coupled to said first control signal, and a second terminal coupled to said control terminal of said synchronous power transistor.

15. The control circuit of claim 7, further comprising:
   a) an enable circuit configured to generate an enable signal;
   b) wherein said synchronous power transistor is controlled to cut off a current path for an inductor current flowing to an output terminal of said boost converter when said enable signal is inactive; and c) wherein said synchronous power transistor is controlled to provide said current path for said inductor current flowing to said output terminal of said boost converter when said enable signal is active.

16. The control circuit of claim 15, further comprising:
a) a first parasitic diode having an anode coupled to a first power terminal of said synchronous power transistor, and a cathode coupled to a body region of said synchronous power transistor;
b) a second parasitic diode having an anode coupled to a second power terminal of said synchronous power transistor, and a cathode coupled to said body region of said synchronous power transistor;
c) a third switch coupled between said body region and said first power terminal of said synchronous power transistor;
d) a fourth switch coupled between said body region and said second power terminal of said synchronous power transistor; and
e) wherein said third switch is turned on and said fourth switch is turned off when said enable signal is inactive, and said third switch is turned off and said fourth switch is turned on when said enable signal is active.

\* \* \* \* \*